United States Patent
Ohtsu

(10) Patent No.: US 7,259,930 B2
(45) Date of Patent: *Aug. 21, 2007

(54) APPARATUS FOR TRANSPORTING A MAGNETIC TAPE

(75) Inventor: Hiroki Ohtsu, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/218,761

(22) Filed: Sep. 6, 2005

(65) Prior Publication Data

US 2006/0066976 A1    Mar. 30, 2006

(30) Foreign Application Priority Data

Sep. 27, 2004   (JP)   ............................. 2004-279828

(51) Int. Cl.
*G11B 15/46*   (2006.01)
*G11B 15/52*   (2006.01)
*G11B 5/584*   (2006.01)

(52) U.S. Cl. ................................ 360/73.04; 360/73.11; 360/77.12

(58) Field of Classification Search ...................... None
See application file for complete search history.

(56) References Cited

U.S. PATENT DOCUMENTS 6,111,719 A * 8/2000 Fasen ...................... 360/73.04
6,542,325 B1   4/2003 Molstad et al.
6,580,581 B1 * 6/2003 Bui et al. ................ 360/78.02
6,879,457 B2   4/2005 Eaton et al.
7,031,087 B2 * 4/2006 Hashimoto .................. 360/53

FOREIGN PATENT DOCUMENTS

JP    08-030942 A    2/1996

* cited by examiner

*Primary Examiner*—Andrea Wellington
*Assistant Examiner*—Jason Olson
(74) *Attorney, Agent, or Firm*—Sughrue Mion, PLLC

(57) ABSTRACT

An apparatus for transporting a magnetic tape includes a writing head, a unit for generating pulse signal, a reading head and a unit for calculating transport speed. The writing head has at least two parallel and linear magnetic gaps spaced a predetermined distance in a tape transport direction. The unit for generating pulse signal cyclically sends a pulse signal to the writing head to write a magnetic pattern corresponding to the magnetic gaps on the magnetic tape. The reading head detects the magnetic pattern to generate a resulting pulse signal. The unit for calculating transport speed calculates a transport speed of the magnetic tape based on the pulse signal sent by the reading head. The unit incorporates a first time interval which is obtained from two parallel and linear pattern components within a magnetic pattern, and a second time interval obtained from adjacent magnetic patterns.

6 Claims, 5 Drawing Sheets

APPARATUS FOR TRANSPORTING A MAGNETIC TAPE

BACKGROUND OF THE INVENTION

The present invention relates to an apparatus for transporting a magnetic tape, and more specifically, to an apparatus for transporting a magnetic tape, which is capable of detecting the transport speed of a magnetic tape, and a method for its detection.

In recent years, magnetic tapes have achieved higher-density recording, and some types of magnetic tapes such as those for computer backup have a storage capacity as large as 200 gigabytes. Such a magnetic tape has several hundreds of data tracks in its width direction to increase its recording density. As a result, each data track has not only a very small width but also a small distance with respect to an adjacent data track. In order that recording and reproducing elements of a magnetic head carry out reliable tracing on the narrow data track for data recording and reproducing, servo patterns are written on the magnetic tape in advance. In this way, during recording or reproducing data for the magnetic tape, the detection elements of the magnetic head detect displacement between the magnetic tape and the magnetic head while they are reading these servo patterns, which enables servo control for the position of the magnetic head (with respect to the magnetic tape in its width direction) (See patent document 1).

In this method, however, accurate detection of displacement of the magnetic head requires accurate recording of the servo patterns on the magnetic tape. This increases the importance of transport speed of the magnetic tape and its fluctuation as control elements for the servo patterns which are written by a servo writer. Control of the transport speed of the magnetic tape has been conventionally performed as follows. A rotational pulse of a take-up reel for winding the magnetic tape or a reel motor is converted into a voltage via a frequency-to-voltage (F/V) conversion circuit, and the converted voltage is compared with a reference voltage so as to control the transport speed. In other words, the conventional detection of a transport speed is not directly carried out based on a speed of the magnetic tape, but based on a speed of a reel motor for winding the magnetic tape. This approach tends to cause an error due to slippage while the magnetic tape is being wound by the take-up reel, thereby hindering improvement in accuracy of detection. As a result, this approach has come to be replaced by another approach using a laser Doppler velocimeter, which is capable of detecting a transport speed directly from a magnetic tape. The laser Doppler velocimeter, which is free from an effect of slippage of the magnetic tape, can detect an accurate transport speed, thereby allowing improvement in accuracy of detection. Patent document 1: Japanese Published Patent Application H08-30942 (paragraphs 0020 and 0021, and FIG. 1)

However, in the case of the laser Doppler velocimeter, it is required that strict control should be imposed on perpendicularity of a laser beam with respect to the magnetic tape. Furthermore, since an external vibration induces an error, the laser Doppler velocimeter requires extremely difficult installation, so that the fact is that satisfactory accuracy has not yet been implemented for high-recording-density magnetic tapes.

SUMMARY OF THE INVENTION

In view of the aforementioned conventional problems, the present invention seeks to provide an apparatus for transporting a magnetic tape which can detect the transport speed of a magnetic tape with a simple setup and high accuracy, and a method for calculating the transport speed.

It is an aspect of the present invention to provide an apparatus for transporting a magnetic tape, which comprises a writing head, a unit for generating pulse signal, a reading head and a unit for calculating transport speed. Brief description is given of each of these components. The writing head, which is disposed over a transport path of the magnetic tape, has at least two parallel and linear magnetic gaps which are spaced a predetermined distance in a direction of transporting the magnetic tape. The unit for generating pulse signal cyclically sends a pulse signal to the writing head to write a magnetic pattern corresponding to the magnetic gaps on the magnetic tape. The reading head, which is disposed downstream the writing head, detects the magnetic pattern, which is written on the magnetic tape, to generate a resulting pulse signal. The unit for calculating transport speed calculates a transport speed of the magnetic tape based on the pulse signal sent by the reading head. The unit incorporates a first time interval of the pulse signal which is obtained from two parallel and linear pattern components within a magnetic pattern and a second time interval of the pulse signal which is obtained from adjacent magnetic patterns.

In the invention described above, the pulse signal sent to the writing head at a predetermined period controls writing of the magnetic patterns on the magnetic tape. Therefore, when the period of the pulse signal is constant, a distance between the magnetic patterns on the magnetic tape is uniquely determined by the transport speed of the magnetic tape. In other words, the distance depends on the transport speed of the magnetic tape while the magnetic patterns are being recorded. In contrast, because the pattern components within the magnetic pattern are simultaneously recorded, their distance is constant depending on the magnetic gaps formed on the writing head. In other words, the distance between the pattern components within the magnetic pattern does not depend on the transport speed of the magnetic tape at the time of writing the magnetic patterns. In this way, it is possible to calculate the transport speed of the magnetic tape at the time of writing the magnetic patterns. More specifically speaking, it is calculated based on the following two time intervals, which are obtained from the pulse signal generated by the reading head that detects the magnetic patterns. One is a reference time interval between pulse signals, which are obtained from two parallel and linear pattern components within a magnetic pattern. The other one is a time interval between pulse signals, which are obtained from adjacent magnetic patterns.

It is another aspect of the present invention to provide an apparatus for transporting a magnetic tape, in which the writing head has another linear magnetic gap. This linear magnetic gap is tilted with respect to the parallel and linear magnetic gaps, and is not parallel with the direction of transporting the magnetic tape.

In the invention described above, the linear pattern components tilted to each other can be written on the magnetic tape.

The present invention, which is able to directly detect the transport speed from the magnetic tape through a predetermined calculation with the pulse signal generated by the reading head, allows a simple setup and high accuracy.

Furthermore, because the present invention provides the magnetic patterns which are not parallel to each other, it is possible to make use of these magnetic patterns as servo patterns in conducting timing-based servo control.

It is still another aspect of the present invention to provide a method for detecting a transport speed of a magnetic tape in an apparatus, which comprises a writing head, a unit for generating pulse signal, a reading head and a unit for calculating transport speed. The method comprises the following steps: (a) storing a frequency of a recording pulse current generated by the unit for generating pulse signal, a selected transport speed (V1) of the magnetic tape and a distance ($L_a$) between two parallel and linear pattern components within a magnetic pattern; (b) detecting a first time interval (A) of a pulse signal sent by the reading head, which is obtained from the pattern components; (c) detecting a second time interval (B) of the pulse signal sent by the reading head, which is obtained from adjacent magnetic patterns; (d) calculating a distance ($L_b$) between the adjacent magnetic patterns with the selected transport speed and the frequency of the recording pulse current; (e) calculating a speed (V) of the magnetic tape by an expression $$V = V1 \times L_a / L_b \times B / A.$$

The method described above, which only requires detection of two types of time intervals in conducting direct detection of the transport speed of the magnetic tape, brings about simple steps and high accuracy.

DESCRIPTION OF THE PREFERRED EMBODIMENTS

Servo patterns to be recorded on a high-recording-density magnetic tape will be described with reference to drawings.

Figure 1A:
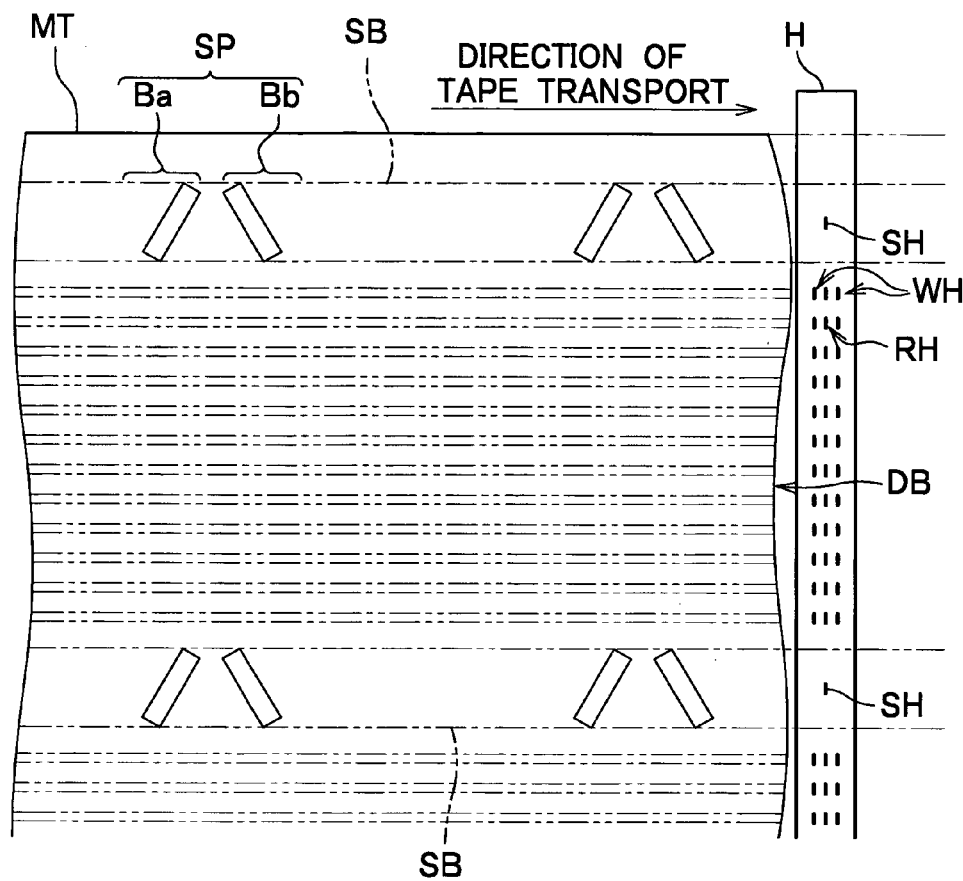
FIG. 1A is a schematic diagram illustrating a magnetic head.

As shown in FIG. 1A, a magnetic tape MT has a plurality of servo bands SB with a predetermined distance therebetween. A data band DB, which has a plurality of data tracks to record data, is disposed between the servo bands SB. Widths of a data track and a servo band SB, and a space between the data tracks are set to be small in order to allow improvement in recording density. Servo patterns (magnetic patterns) SP each formed of two linear pattern components Ba and Bb, which are tilted to each other, are recorded on a servo band SB at predetermined intervals.

A magnetic head H, which is provided in a drive of a magnetic tape, has a plurality of elements SH for reading servo information, elements WH for writing data and elements RH for reproducing data. An element SH is allocated to a servo band SB. Two elements WH and one element RH, which are aligned in a transport direction of the magnetic tape MT, are allocated to each data track of a data band DB.

Figure 1B:
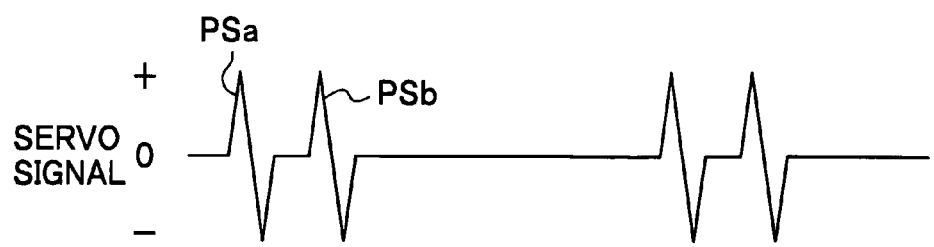
FIG. 1B shows a servo pattern.

When the drive carries out a data recording/reproducing operation for the magnetic tape MT, each element SH of the magnetic head H detects the servo patterns SP, and generates a servo signal corresponding to the servo patterns SP, as shown in FIG. 1B. Linear patterns Ba and Bb of a servo pattern SP, which are tilted to each other, are not parallel with respect to the transport (longitudinal) direction of the magnetic tape MT but traverse it. As a result, timing of an element SH to generate pulse signals at the time of detection of the linear pattern components Ba and Bb varies according to a relative position between the magnetic head H and the magnetic tape MT in its width direction.

Consequently, it is possible to detect an amount of displacement of the magnetic head H with respect to the magnetic tape MT in a lateral direction based on a time interval between a pulse signal PSa obtained from the linear pattern Ba and a pulse signal PSb obtained from the linear pattern Bb. If a position of the magnetic head H is adjusted so as to reduce the amount of displacement, it is possible to allow data writing elements WH and a data reading element RH to accurately trace a track in a data band DB. In this way, data recording/reproducing operation can be conducted without error. Servo patterns SP are recorded by a servo writer before a magnetic tape is loaded into a cartridge to be assembled into a finished product.

Description is given of a servo writer, to which the present invention is applied, as an example of an apparatus for transporting a magnetic tape.

Figure 2:
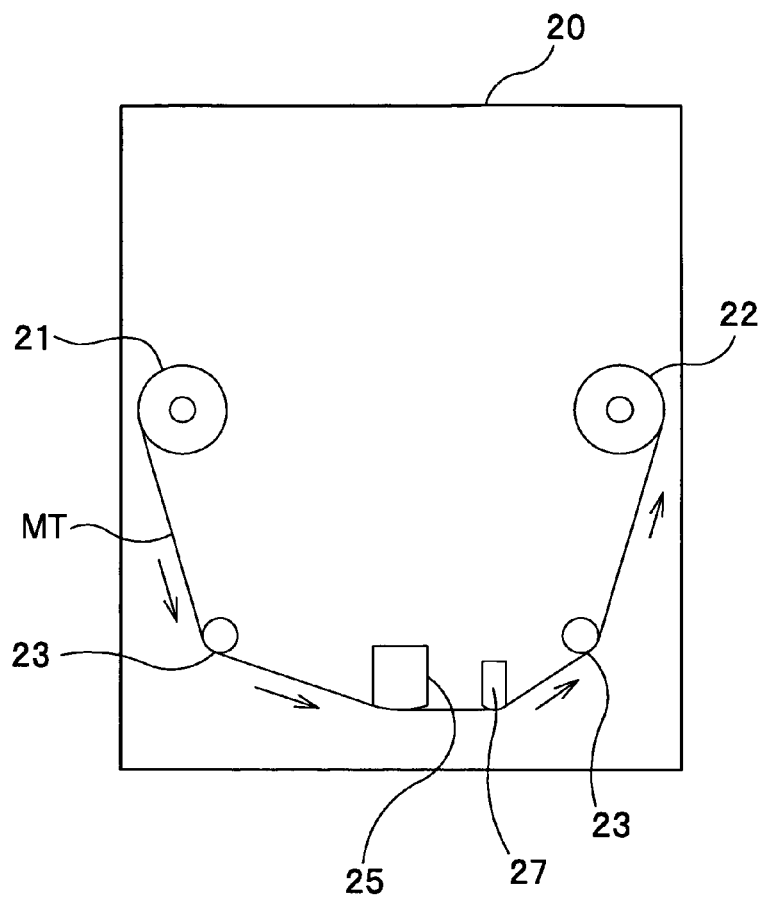
FIG. 2 is a schematic diagram illustrating a transport path of a magnetic tape in a servo writer.
Figure 3:
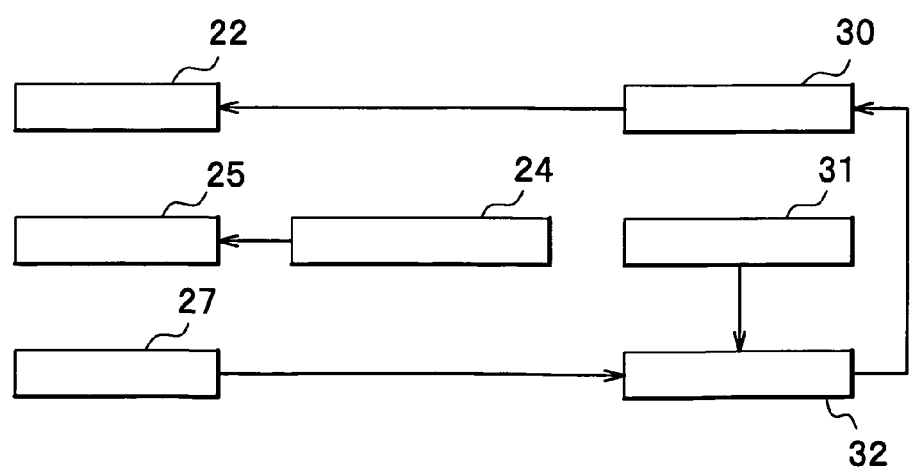
FIG. 3 is a block diagram showing a setup of a control device of a servo writer.

As shown in FIG. 2, a servo writer 20 includes a supply reel 21, a take-up reel 22, two guides 23, a writing head 25 and a reading head 27.

A magnetic tape MT, which is cut out from a wide web roll into a pancake so as to have a required width, is set on the supply reel 21, which feeds the magnetic tape MT. At this time, the servo patterns SP have not yet been recorded on the magnetic tape MT. Guided by the two guides 23, the magnetic tape MT fed from the supply reel 21 is wound by the take-up reel 22. Between the two guides 23 on the transport path of the magnetic tape MT, the writing head 25 is disposed upstream the reading head 27. When the magnetic tape MT passes through the writing head 25, the magnetic tape MT is recorded the servo patterns SP by the writing head 25. Before the take-up reel 22 winds the magnetic tape MT on which the servo patterns SP have been recorded, the reading head 27 detects the servo patterns SP, generating a servo signal.

Figure 4:
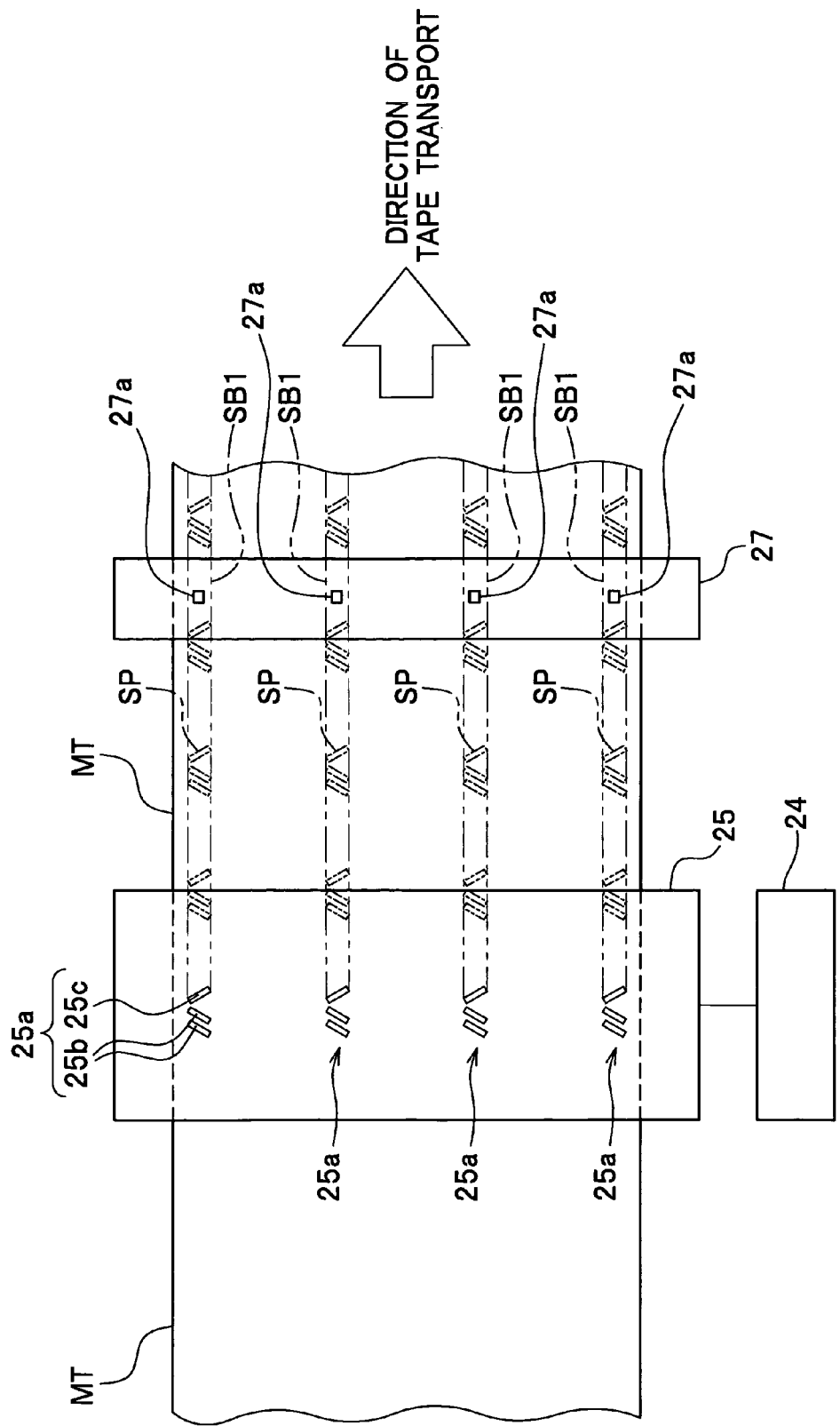
FIG. 4 is a schematic diagram illustrating a setup of a writing head and reading head.

In order to write the servo patterns SP, the writing head 25 has a coil for generating a magnetic flux, and magnetic gaps 25a on its surface facing the magnetic tape MT. The magnetic gaps 25a are arranged in such a manner that four of them are aligned at predetermined intervals so as to form four servo bands SB1 on the magnetic tape MT as shown in FIG. 4. Each magnetic gap 25a has two linear gaps 25b which are parallel to each other at a predetermined angle with a longitudinal direction of the tape, and also has a linear gap 25c tilting with respect to the linear gaps 25b as shown in FIG. 4. The magnetic gaps 25a are formed by lithography with the application of a semiconductor technique in order not only to cope with their small dimensions, but also to improve the parallelism between two linear gaps 25b.

The reading head 27 is a head, which detects the servo patterns SP written on the magnetic tape MT, generating a servo signal. As shown in FIG. 4, the reading head 27 has four reading elements 27a, which are aligned in a similar manner as in the writing head 25 so as to establish correspondence to the four positions of the servo bands SB1 in the width direction of the magnetic tape MT. The reading head 27 detects servo patterns SP for each servo band SB1, generating a servo signal. Each reading element 27a is adapted to be smaller than a linear gap 25b in the width direction of the tape.

A control device of the servo writer 20 has a control unit 30, a unit 24 for generating pulse current and a unit 32 for calculating transport speed. The control unit 30 controls rotation of the take-up reel 22. The unit 24 sends a recording pulse current to the writing head 25. The unit 32 calculates a transport speed of the magnetic tape MT based on a servo signal generated by the reading head 27. The unit 32 receives a reference pulse signal, which is generated by a unit 31 for generating reference signal.

The take-up reel 22 has a reel motor, which rotates the take-up reel 22 so as to wind the magnetic tape MT. The control unit 30 controls the reel motor so as to control the transport speed of the magnetic tape MT while the servo patterns SP are being written. Note that the supply reel 21 has a tension mechanism (not shown), which applies a constant tension to the magnetic tape MT while fed to the taken up reel 22. In this way, the tension mechanism prevents sagging, providing stabilization of the transport speed.

The unit 24 is a circuit to supply a recording pulse current to the coil of the writing head 25 so that a magnetic gap 25a generates leakage flux to write a servo pattern SP. The unit 24 supplies the writing head 25 with a recording pulse current, which is given a predetermined frequency according to a selected transport speed V1 of the magnetic tape MT. Accordingly, when the magnetic tape MT has a constant transport speed, a servo pattern SP, which has the same shape as a magnetic gap 25a, is recorded on the magnetic tape MT at regular intervals as shown in FIG. 4.

In order to detect a transport speed of the magnetic tape MT, the reading head 27 detects servo patterns SP from the magnetic tape MT while passing through the reading head 27, generating a servo signal. FIG. 4 shows the reading head 27 and the writing head 25 which lie away from each other for the sake of explanation. However, it is preferable but not mandatory that the reading head 27 is positioned close to the writing head 25 in order to reduce a time difference between recording of a servo pattern SP and its detection in the form of a servo signal.

As shown in FIG. 4, a servo pattern SP recorded on the magnetic tape MT has the same shape as a magnetic gap 25a formed in the writing head 25. More specifically speaking, two linear pattern components Bb1 and Bb2 are parallel to each other at a predetermined angle with respect to a longitudinal direction of a tape. A linear pattern Bc is tilted to the linear pattern components Bb1 and Bb2, and is not parallel with a direction of transport of the magnetic tape MT. The linear pattern components Bb1, Bb2 and Bc correspond to the magnetic gaps 25b, 25b and 25c shown in FIG. 4, respectively.

Figure 5A:
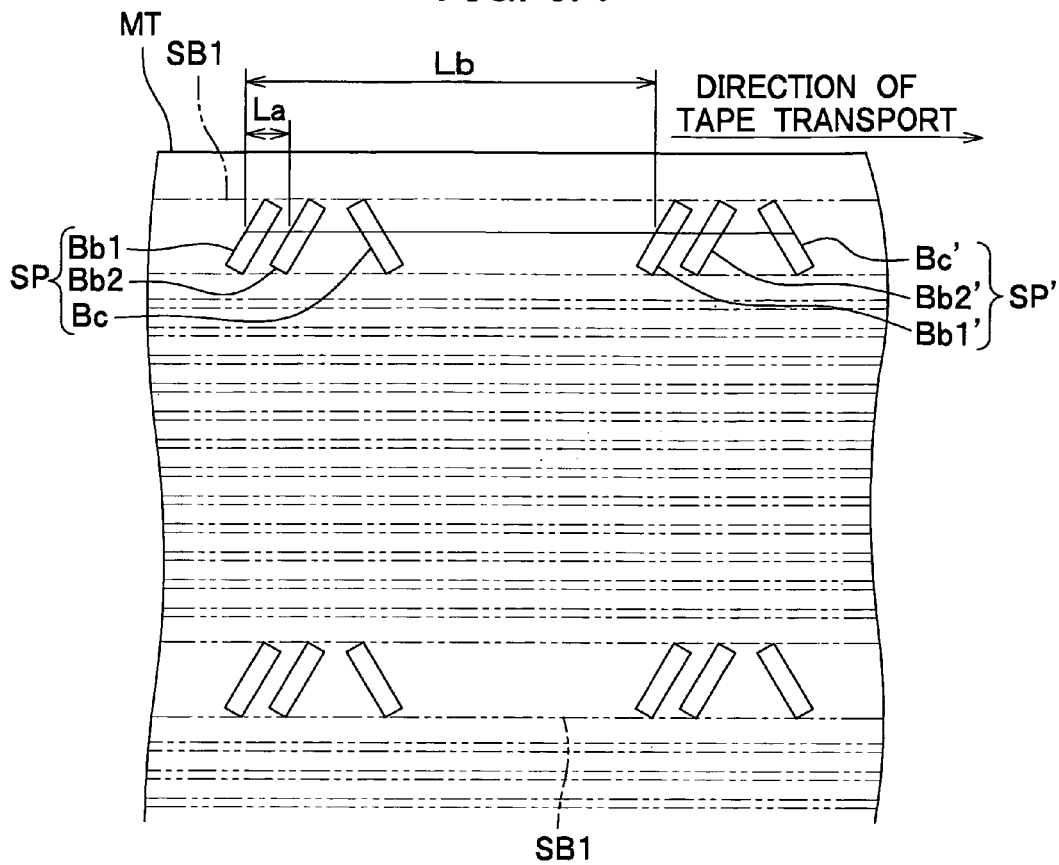
FIG. 5A shows servo patterns recorded on a magnetic tape.

In this way, a distance between the linear pattern components Bb1 and Bb2 parallel to each other will not change even if the magnetic tape MT shifts in the width direction, as long as a reading element 27a of the reading head 27 keeps its location within a servo band SB1. As a result, as shown in FIG. 5C, irrespective of the position of the reading head 27, a constant time interval A is obtained from a pulse signal PSb1 and a pulse signal PSb2, which are generated by the reading head 27 for the linear pattern Bb1 and the linear pattern Bb2, respectively. The time interval A is used for detection of a transport speed of the magnetic tape to be described later. In contrast, a distance between the linear pattern components Bc and Bb2 changes according to displacement of the magnetic tape MT in the width direction.

In this way, it is possible to detect a displacement of the magnetic tape MT in its lateral direction with a time interval M between a pulse signal PSb2 obtained from a linear pattern Bb2 and a pulse signal PSc obtained from a linear pattern Bc. More specifically speaking, when detection for the transport speed of the magnetic tape MT is carried out in the servo writer 20, the parallel linear pattern components Bb1 and Bb2 are incorporated into the detection. In contrast, when a data recording/reproducing operation is carried out for the magnetic tape MT by a drive, servo control with the linear pattern components Bb2 and Bc is applied to the magnetic head H (See FIG. 1).

In this connection, in case it is necessary to control a position of the magnetic tape MT in the width direction with respect to the writing head 25, it may be possible to servo control the writing head 25 with the linear pattern components Bb2 and Bc.

Figure 5B:
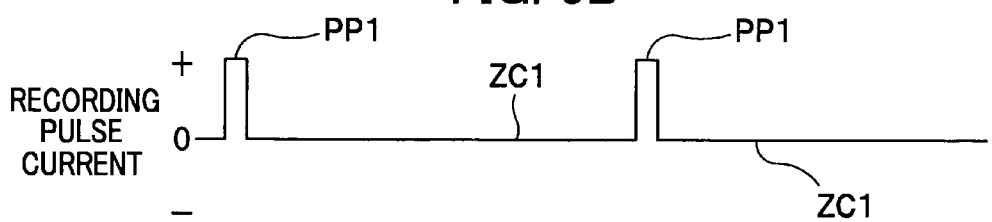
FIG. 5B shows a recording pulse current generated by a unit for generating pulse current.
Figure 5C:
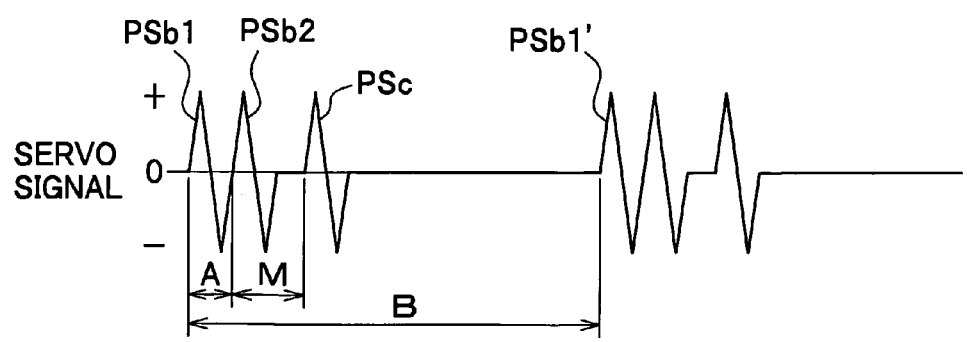
FIG. 5C shows a servo signal generated by a reading head.

The unit 24 for generating pulse current sends a recoding pulse current PP1 having a constant period as shown in FIG. 5B to the writing head 25, which writes a servo pattern SP on a magnetic tape as described above. Therefore, as shown in FIG. 5A, a distance Lb between two adjacent servo patterns SP on a magnetic tape MT is determined by a transport speed V of the magnetic tape MT and a resting time interval ZC1, during which no recording pulse current PP1 is generated. Since the period of the recording pulse current PP1 is adapted to have a constant value in accordance with the selected transport speed V1 of the magnetic tape MT, the resting time interval ZC1 results in a constant value. In this way, the distance Lb is uniquely determined by the selected transport speed V1. As to a servo signal of the reading head 27, pulse signals PSb1, PSb2 and PSc correspond to linear pattern components Bb1, Bb2 and Bc, respectively, as shown in FIG. 5C. Accordingly, it is possible to obtain the distance Lb with measurement of a time interval B between the pulse signal PSb1 and an immediately preceding pulse signal PSb1', so that it is possible to detect a transport speed of the magnetic tape MT. Direct measurement of the time interval B, which incorporates time as a reference, requires a highly accurate timer in order to increase accuracy of detection. In contrast, the servo writer 20 provides accurate detection of the transport speed with a simple setup. Description is given of this detection as follows.

As described above, the distance Lb between the adjacent servo patterns SP uniquely depends on the transport speed V of the magnetic tape MT when the recording pulse current PP1 has a constant frequency. In contrast, as to a servo pattern SP, because linear pattern components Bb1, Bb2 and Bc are written at the same timing, triggered by the same recording pulse current PP1, distances between these linear pattern components do not depend on the transport speed V of the magnetic tape MT at the time of writing. Therefore, if the distance Lb between adjacent servo patterns SP is measured by incorporating a distance between the linear pattern components Bb1, Bb2 and Bc as a reference, which is independent of a transport speed, it is possible to detect the transport speed without an effect of accuracy of a timer. This leads to providing detection with a simple setup and high precision. In particular, a distance La between linear pattern components Bb1 and Bb2 is constant without depending on the position of the reading head 27 with respect to the magnetic tape MT in its width direction. Because it is possible to detect the transport speed without decreasing accuracy regardless of positional shifting of the reading head 27, higher accuracy of detection will be achieved.

Figure 6A:
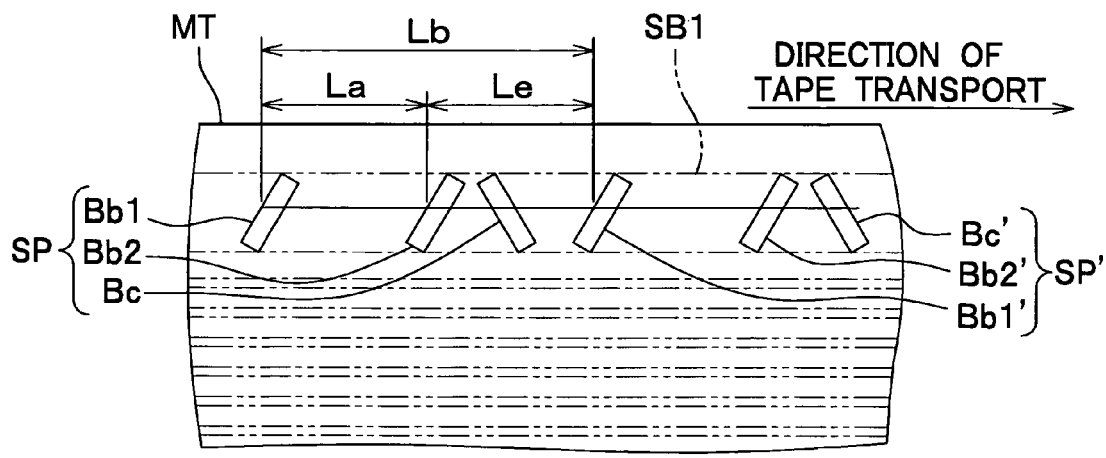
FIG. 6A is a schematic diagram illustrating servo patterns on a magnetic tape.
Figure 6B:
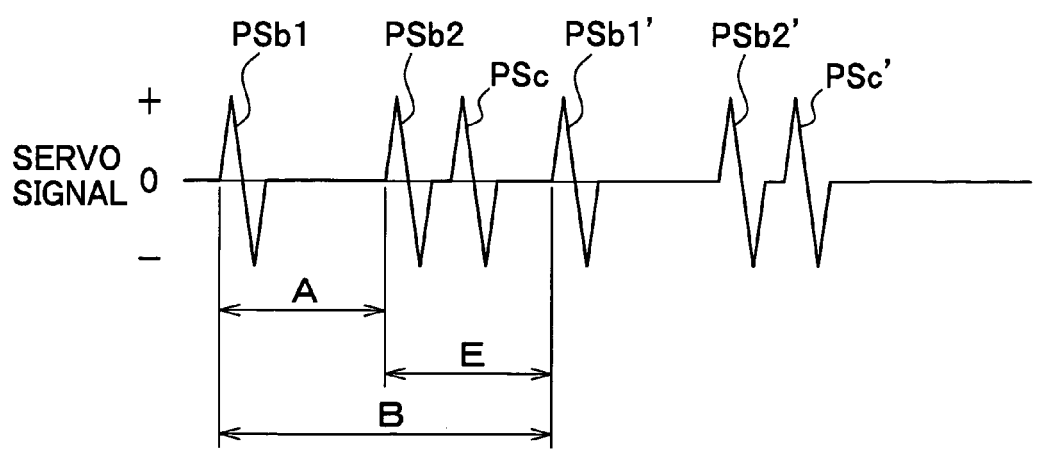
FIG. 6B is a schematic diagram illustrating a servo signal.

An example for calculation of the transport speed will be described as follows with reference to FIGS. 6A and 6B.

Assuming that the distance La between the linear pattern components Bb1 and Bb2 written on the magnetic tape MT in its transport direction is 100 μm, the selected transport speed V1 of the magnetic tape MT is 5 m/s, and the frequency of the recording pulse current is 25 KHz, the distance Lb of adjacent servo patterns SP written on the magnetic tape MT equals 200 μm. In other words, when the frequency of the recording pulse current is 25 KHz and the selected transport speed V1 of the magnetic tape MT is 5 m/s, a ratio Lb/La equals 2. As a result, as shown in FIG. 6B, a ratio B/A also equals 2, in which B represents a time interval between a pulse signal PSb1 obtained from a linear pattern Bb1 and a pulse signal PSb1' obtained from an immediately preceding linear pattern Bb1', and A represents a time interval between the pulse signal PSb1 and a pulse signal PSb2 obtained from a linear pattern Bb2. Thus, if the ratio B/A is equal to 2, the transport speed V is the same as the selected transport speed V1, 5 m/s. If the ratio B/A is greater than 2, the transport speed V is greater than the selected transport speed V1, 5 m/s. If the ratio B/A is smaller than 2, the transport speed V is smaller than the selected transport speed V1, 5 m/s.

Consequently, it is possible to calculate a transport speed V of the magnetic tape MT based on known values, a ratio Lb/La, a selected transport speed V1 and a ratio B/A. In this method, because the time interval A is a reference value, a resolution of 0.1 μm can be obtained in an example described above if 50 MHz is selected as a reference frequency for measuring the time intervals. In other words, accuracy of detection 0.1% can be obtained for the transport speed V. This method, which does not use time as a reference, does not affect the accuracy of detection, even if the reference frequency has an error as long as it concurrently appears in the detection of the time intervals A and B. This makes it possible to detect the transport speed V without depending on accuracy of the unit 31 for generating reference signal.

The unit 32 for calculating transport speed stores a frequency of the recording pulse current generated by the unit 24 for generating pulse current and a selected transport speed V1 of the magnetic tape MT. The unit 32 also stores a distance between two linear gaps 25b within a magnetic gap 25a, designating as a distance La between linear pattern components Bb1 and Bb2 within a servo pattern SP, which is written on the magnetic tape MT. The reason for carrying out this operation is that the servo pattern SP has the same shape as the magnetic gap 25a of the writing head 25 as shown in FIG. 4. The unit 32 detects the time interval A between the pulse signals PSb1 and PSb2, which correspond to the linear pattern components Bb1 and Bb2, respectively. More specifically speaking, receiving a servo signal generated by the reading head 27 as shown in FIG. 6B, the unit 32 calculates the time interval A by counting reference pulse signals, which are sent by the unit 31 for generating reference signal.

Similarly, the unit 32 detects the time interval B between the pulse signal PSb1 and a pulse signal PSb1', which corresponds to a linear pattern component Bb1' in an immediately preceding servo pattern SP', by counting reference pulse signals generated by the unit 31. In this connection, the servo pattern SP' also includes linear pattern components Bb2' and Bc', from which pulse signals PSb2' and PSc' are obtained, respectively. The unit 32 executes division of B/A with these two values. Incorporating the ratio B/A in addition to the stored values described above, such as the distance La, the selected transport speed V1 and the frequency of the recording pulse current, the unit 32 calculates a transport speed V of the magnetic tape MT by an expression, V1×(La/Lb)×(B/A). In this connection, the distance Lb is calculated based on the selected transport speed V1 and the frequency of the recording pulse current. For example, when the ratio B/A is 2.2, a calculation for the example described above by the expression V1×(La/Lb)×(B/A) results in a transport speed V of 5.5 m/s.

The transport speed V calculated by the unit 32 is sent to the control unit 30, which controls a reel motor so as to decrease a difference obtained from a comparison between a current transport speed and the selected transport speed.

In this manner, the magnetic tape MT, which is fed by the supply reel 21, is written the servo patterns SP and wound by the take-up reel 22. This magnetic tape MT, which is subsequently cut at a predetermined length, is loaded into a cartridge so as to be a finished product.

The servo writer 20 is able to provide highly accurate detection of the transport speed V with a simple setup. This is ascribed to the fact that when the servo writer 20 writes the servo patterns SP, it is able to detect the transport speed V directly from the magnetic tape MT only by detecting two types of time intervals based on the servo signal, which is generated by the reading head 27 detecting the servo patterns SP. In addition, it may be possible to increase accuracy of detection if a higher frequency is selected for the reference pulse signal, which is generated by the unit 31 for generating reference signal. Since an error in the frequency of the reference pulse does not have an adverse effect on detection, it may be possible to easily control accuracy for the unit 31, which allows stable maintenance of the accuracy over a long period of time. In this way, it is possible to provide highly accurate control for the transport speed V of the magnetic tape MT as a result of such high accuracy of its detection, which enables writing of the servo patterns SP with high accuracy.

The embodiment described above introduces the distance Lb between adjacent servo patterns SP as information depending on the transport speed V. However, it may be alternatively possible to use a distance Le between a linear pattern component Bb2 and an immediately preceding linear pattern component Bb1', as shown in FIG. 6A. In this case, as shown in FIG. 6B, the transport speed V is calculated with a time interval E between pulse signals PSb2 and PSb1', which correspond to the linear pattern components Bb2 and Bb1', respectively.

Foreign priority document, JP2004-279828 filed on Sep. 27, 2004, is hereby incorporated by reference.

What is claimed is:

1. An apparatus for transporting a magnetic tape comprising:
   a writing head disposed over a transport path of the magnetic tape, the writing head having at least two parallel and linear magnetic gaps which are spaced a predetermined distance in a direction of transporting the magnetic tape;
   a unit for generating pulse signal which cyclically sends a pulse signal to the writing head to write a magnetic pattern corresponding to the magnetic gaps on the magnetic tape;
   a reading head disposed downstream the writing head, the reading head detecting the magnetic pattern, which is written on the magnetic tape, to generate a resulting pulse signal; and a unit for calculating transport speed which calculates a transport speed of the magnetic tape based on the pulse signal sent by the reading head, wherein the unit incorporates a first time interval of the pulse signal which is obtained from two parallel and linear pattern components within a magnetic pattern and a second time interval of the pulse signal which is obtained from adjacent magnetic patterns.

2. An apparatus for transporting a magnetic tape according to claim 1, wherein the writing head has another linear magnetic gap which is tilted with respect to the parallel and linear magnetic gaps, and is not parallel with the direction of transporting the magnetic tape.

3. The apparatus for transporting a magnetic tape according to claim 1, further comprising a control unit operative to control the transport speed of the magnetic tape by controlling a reel motor.

4. The apparatus for transporting a magnetic tape according to claim 1, wherein the unit for calculating transport speed comprises a unit for generating a reference pulse signal which is used for calculating the transport speed of the magnetic tape.

5. The apparatus for transporting a magnetic tape according to claim 1, Wherein a size of the reading head in a width direction of the magnetic tape is smaller than a size of two linear gaps in a width direction of the magnetic tape, each of the linear gaps being formed at a predetermined angle with respect to a longitudinal direction of the magnetic tape.

6. A method for detecting a transport speed of a magnetic tape in an apparatus, which comprises a writing head, a unit for generating pulse signal, a reading head and a unit for calculating transport speed, the method comprising the steps of:

storing a frequency of a recording pulse current generated by the unit for generating pulse signal, a selected transport speed (V1) of the magnetic tape and a distance ($L_a$) between two parallel and linear pattern components within a magnetic pattern;

detecting a first time interval (A) of a pulse signal sent by the reading head, which is obtained from the pattern components;

detecting a second time interval (B) of the pulse signal sent by the reading head, which is obtained from adjacent magnetic patterns;

calculating a distance ($L_b$) between the adjacent magnetic patterns with the selected transport speed and the frequency of the recording pulse current; and calculating a speed (V) of the magnetic tape by an expression $V = V1 \times L_a / L_b \times B/A.$

* * * * *